US009869206B2

(12) United States Patent
Von Berg

(10) Patent No.: US 9,869,206 B2
(45) Date of Patent: Jan. 16, 2018

(54) SECURING A CENTERING SPRING TO A STATIC STRUCTURE WITH MOUNTING TABS

(71) Applicant: United Technologies Corporation, Farmington, CT (US)

(72) Inventor: Kaleb Von Berg, East Hartford, CT (US)

(73) Assignee: United Technologies Corporation, Farmington, CT (US)

( * ) Notice: Subject to any disclaimer, the term of this patent is extended or adjusted under 35 U.S.C. 154(b) by 0 days.

(21) Appl. No.: 15/188,310

(22) Filed: Jun. 21, 2016

(65) Prior Publication Data

US 2017/0362958 A1    Dec. 21, 2017

(51) Int. Cl.
| F16C 23/10 | (2006.01) |
| F01D 25/16 | (2006.01) |
| F02C 7/06 | (2006.01) |
| F16C 27/04 | (2006.01) |

(52) U.S. Cl.
CPC ............... *F01D 25/164* (2013.01); *F02C 7/06* (2013.01); *F16C 27/04* (2013.01); *F05D 2220/32* (2013.01); *F05D 2240/50* (2013.01); *F05D 2240/60* (2013.01); *F05D 2260/52* (2013.01); *F16C 2360/23* (2013.01)

(58) Field of Classification Search
CPC .... F16C 27/04; F16C 27/066; F16C 2360/23; F01D 25/16; F01D 25/162; F01D 25/164; F02C 7/06
See application file for complete search history.

(56) References Cited

U.S. PATENT DOCUMENTS

| 3,960,418 A | * | 6/1976 | Bracken ................. F16C 27/04 |
| | | | 384/535 |
| 4,981,415 A | | 1/1991 | Marmol et al. |
| 7,524,112 B2 | * | 4/2009 | Gerez ..................... F16C 27/04 |
| | | | 384/101 |
| 8,360,714 B2 | | 1/2013 | Otto et al. |
| 8,366,385 B2 | | 2/2013 | Davis et al. |
| 8,439,637 B2 | | 5/2013 | DiBenedetto et al. |
| 8,747,054 B2 | | 6/2014 | Witlicki |
| 8,834,095 B2 | | 9/2014 | Davis |
| 8,845,277 B2 | | 9/2014 | Davis |
| 8,869,504 B1 | | 10/2014 | Schwarz et al. |
| 8,911,204 B2 | | 12/2014 | Davis et al. |

(Continued)

OTHER PUBLICATIONS

Extended EP Search Report for EP Appln. No. 17176362.6 dated Nov. 22, 2017.

*Primary Examiner* — James Pilkington
(74) *Attorney, Agent, or Firm* — O'Shea Getz P.C.

(57) ABSTRACT

An assembly is provided for a piece of rotational equipment with an axis. This assembly includes a static structure, a bearing within a bore of the static structure, and a centering spring mounting the bearing to the static structure. The static structure is configured with the bore, a slot, a first slot surface and a second slot surface. The slot extends radially into the static structure from the bore. The slot extends axially within the static structure between the first slot surface and the second slot surface. The centering spring includes an annular hub and a mounting tab. The annular hub is within the bore. The mounting tab projects radially from the annular hub into the slot.

19 Claims, 15 Drawing Sheets

(56) References Cited

U.S. PATENT DOCUMENTS

| | | |
|---|---|---|
| 8,915,702 B2 | 12/2014 | Otto et al. |
| 9,004,849 B2 | 4/2015 | Munsell et al. |
| 2005/0240867 A1 | 10/2005 | Forbes |
| 2012/0189429 A1 | 7/2012 | Witlicki |
| 2013/0108202 A1 | 5/2013 | Do et al. |
| 2013/0280063 A1 | 10/2013 | Ganiger et al. |
| 2015/0240867 A1 | 8/2015 | Amador et al. |
| 2016/0258323 A1 | 9/2016 | Grogg et al. |

* cited by examiner

SECURING A CENTERING SPRING TO A STATIC STRUCTURE WITH MOUNTING TABS

BACKGROUND OF THE INVENTION

1. Technical Field

This disclosure relates generally to a piece of rotational equipment and, more particularly, to a centering spring for mounting a bearing to a static structure.

2. Background Information

A piece of rotational equipment such as a gas turbine engine may include a centering spring for mounting a bearing to a static structure. Various methodologies are known in the art for securing the centering spring to the static structure. However, these known methodologies may be difficult to implement as the physical size of a gas turbine engine is decreased. There is a need in the art therefore for improved methodologies for securing a centering spring to a static structure.

SUMMARY OF THE DISCLOSURE

According to an aspect of the present disclosure, an assembly is provided for a piece of rotational equipment with an axis. This assembly includes a static structure, a bearing and a centering spring mounting the bearing to the static structure. The static structure is configured with a bore, a slot, a first slot surface and a second slot surface. The slot extends radially into the static structure from the bore. The slot extends axially within the static structure between the first slot surface and the second slot surface. The centering spring includes an annular hub and a mounting tab. The annular hub is within the bore, and the mounting tab projects radially from the annular hub into the slot.

According to another aspect of the present disclosure, another assembly is provided for a piece of rotational equipment with an axis. This assembly includes a static structure, a bearing and a centering spring mounting the bearing to the static structure. The static structure is configured with a bore, a slot, a first slot surface and a second slot surface. The slot extends radially into the static structure from the bore. An inner portion of the slot extends axially within the static structure between the first slot surface and the second slot surface. An outer portion of the slot extends axially into the static structure to the second slot surface. The bearing is within the bore. The centering spring includes an annular hub and a mounting tab. The annular hub is within the bore. The mounting tab projects radially from the annular hub into the inner portion of the slot.

The centering spring may be configured such that the mounting tab is operable to slide axially through the outer portion of the slot towards the second slot wall and then slide circumferentially into the inner portion of the slot.

The assembly may include a lock ring including a locking tab. The locking tab may project radially into the outer portion of the slot. The locking tab may engage and be circumferentially between the static structure and the mounting tab.

The assembly may include a retainer ring axially securing the lock ring within the bore.

The mounting tab may be disposed between the first slot surface and the second slot surface.

The slot may have a generally L-shaped geometry.

An inner portion of the slot may extend axially within the static structure between the first slot surface and the second slot surface. An outer portion of the slot may extend axially into the static structure to the second slot surface. The mounting tab may be disposed at least partially within the inner portion of the slot.

The inner portion of the slot may extend circumferentially within the static structure to a third slot surface. The third slot surface may be axially between the first slot surface and the second slot surface, and may be angularly offset from the first slot surface and the second slot surface by a non-ninety degree included angle. The mounting tab may engage the third slot surface.

The mounting tab may extend axially between a first tab surface and a second tab surface and circumferentially to a third tab surface. The third tab surface may be axially between the first tab surface and the second tab surface, and may be angularly offset from the first tab surface and the second tab surface by a non-ninety degree included angle. The locking tab may engage the third tab surface.

The mounting tab may extend axially between a first tab surface and a second tab surface and circumferentially to a third tab surface. The third tab surface may be axially between the first tab surface and the second tab surface, and may be angularly offset from the first tab surface and the second tab surface by a non-ninety degree included angle. The static structure may engage the third tab surface.

At least a portion of the mounting tab may have a wedge-shape geometry configured to be circumferentially wedged into a portion of the slot.

The slot may be one of a plurality of slots. The first slot surface may be one of a plurality of first slot surfaces. The second slot surface may be one of a plurality of second slot surfaces. Each of the slots may extend radially into the static structure from the bore and extend axially within the static structure between a respective one of the first slot surfaces and a respective one of the second slot surfaces. The mounting tab may be one of a plurality of mounting tabs disposed circumferentially about the annular hub. Each of the mounting tabs may project radially out from the annular hub into a respective one of the slots and may be disposed between a respective one of the first slot surfaces and a respective one of the second slot surfaces.

The centering spring may include a first mounting portion, a second mounting portion and a spring portion extending axially between the first mounting portion and the second mounting portion. The first mounting portion may include the annular hub and the mounting tab. The bearing may be within and mounted to the second mounting portion.

The spring portion may include a plurality of tapered spring beams arranged about the axis.

The piece of rotational equipment may be configured as a gas turbine engine.

The assembly may include a rotating assembly. The bearing may circumscribe the rotating assembly and rotatably mount the rotating assembly to the centering spring.

The foregoing features and the operation of the invention will become more apparent in light of the following description and the accompanying drawings.

DETAILED DESCRIPTION OF THE INVENTION

Figure 1:
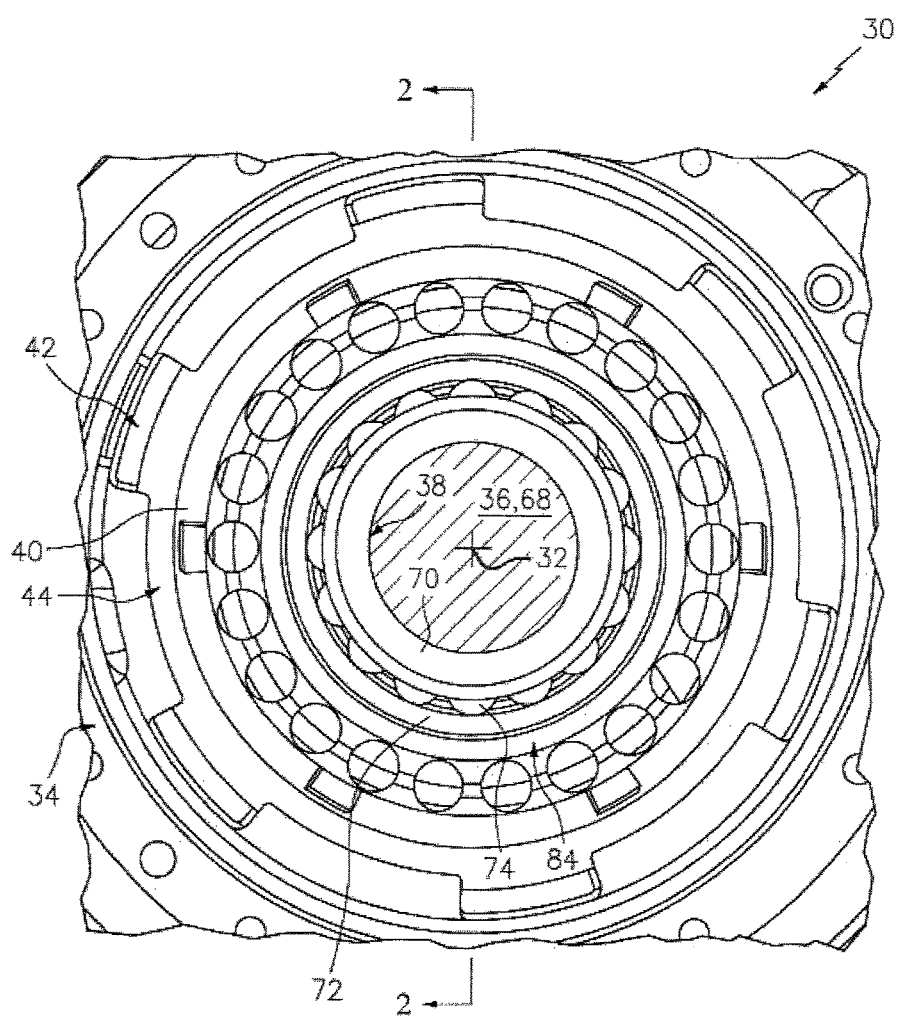
FIG. 1 is a front view illustration of a portion of an assembly for a piece of rotational equipment.
Figure 2:
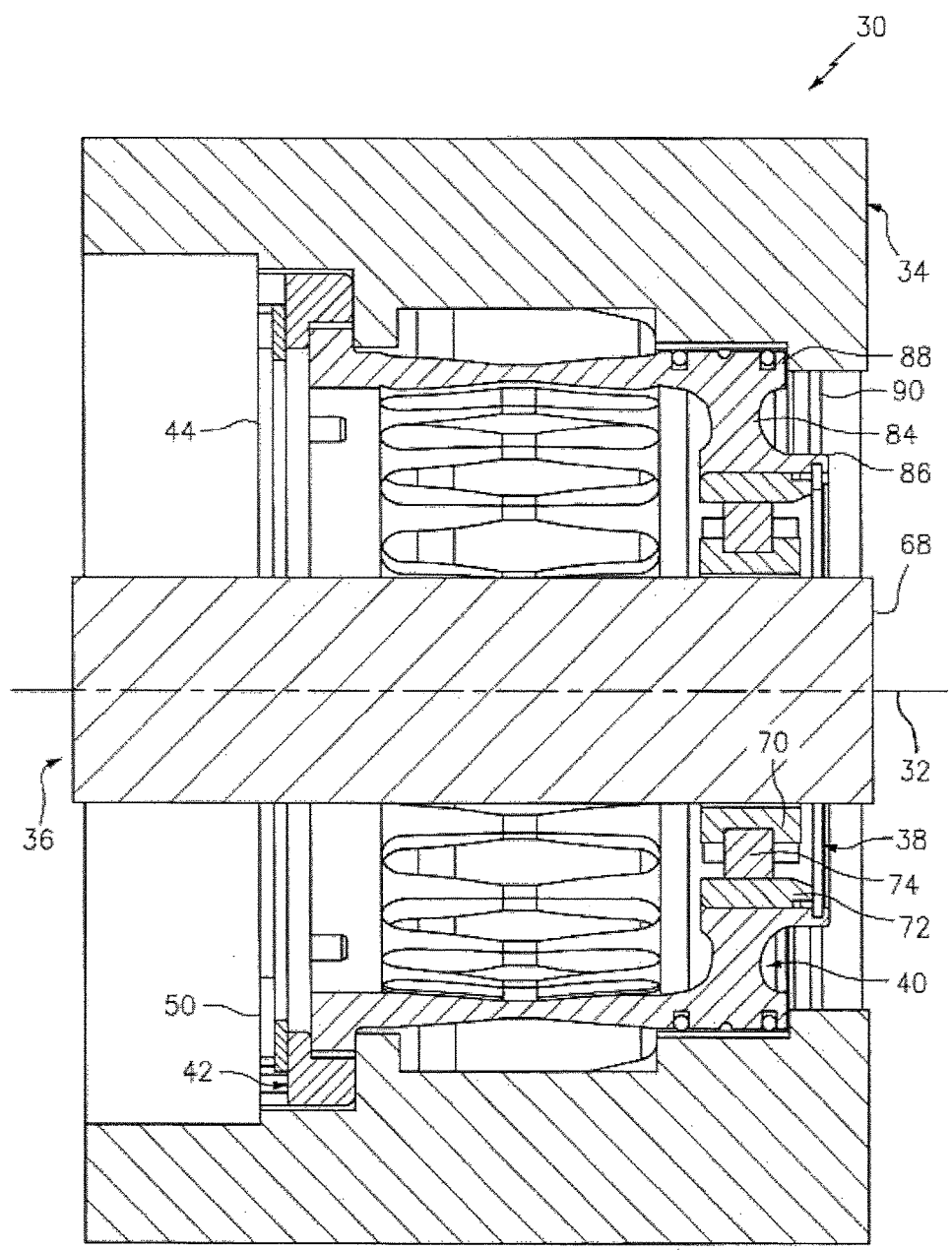
FIG. 2 is a side sectional illustration of the assembly.

FIGS. 1 and 2 illustrate an assembly 30 for a piece of rotational equipment such as a gas turbine engine. This rotational equipment assembly 30 extends along a rotational axis 32. The rotational equipment assembly 30 includes a static structure 34, a rotating assembly 36 and a bearing 38. The rotational equipment assembly 30 also includes a centering spring 40, a lock ring 42 and a retainer ring 44 (e.g., a split ring).

Figure 3:
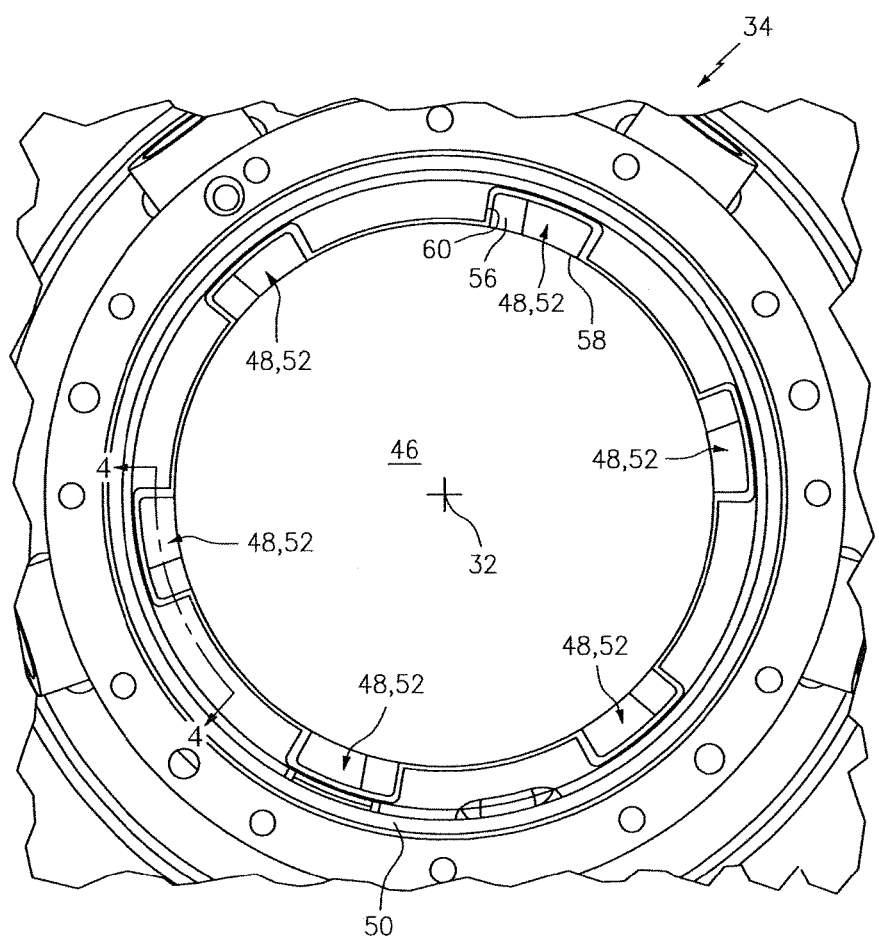
FIG. 3 is a front view illustration of a portion of a static structure.

The static structure 34 is configured as a structure such as, but not limited to, a case, a housing or a hub. Referring to FIG. 3, the static structure 34 is configured with an inner bore 46 and one or more slots 48. At least a portion of the static structure 34 forming the slots 48 or the entire structure 34 may be a monolithic, unitary body. The bore 46 extends axially along the axis 32 through (or into) the static structure 34 from an (e.g., front) end surface 50 of the static structure 34; see also FIG. 2.

Figure 4:
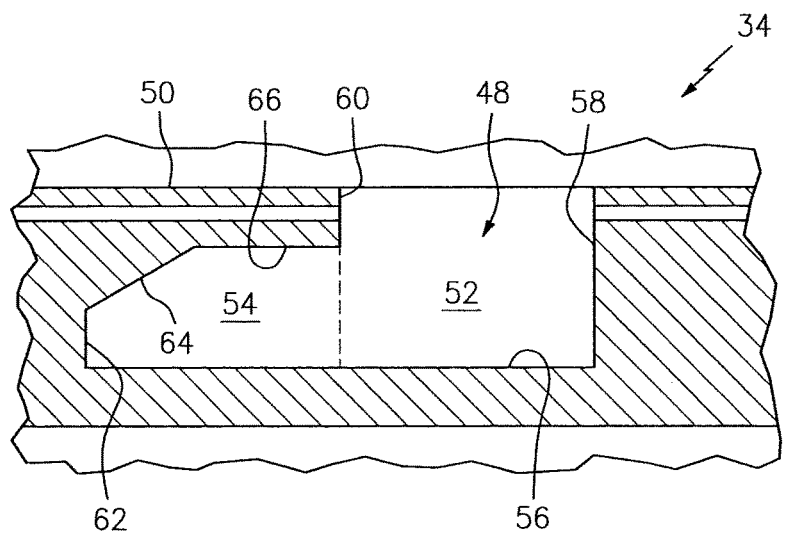
FIG. 4 is a schematic, sectional illustration of a portion of the static structure.

The slots 48 are arranged circumferentially around the axis 32 and the bore 46. Referring to FIG. 4, each of the slots 48 extends radially outward from the bore 46 and partially into the static structure 34. Each of the slots 48 may have a generally L-shaped geometry. Each of the slots 48, for example, may include an outer portion 52 and an inner portion 54.

The outer portion 52 extends axially into the static structure 34 from the end surface 50 to an (e.g., rear) end slot surface 56. The outer portion 52 extends circumferentially within the static structure 34 from a side slot surface 58 to a side slot surface 60 and the inner portion 54.

The inner portion 54 extends circumferentially within the static structure 34 from the outer portion 52 to a side slot surface 62 and an angled slot surface 64. The inner portion 54 extends axially within the static structure 34 from the end slot surface 56 to an (e.g., front) end slot surface 66 and the angled slot surface 64. This angled slot surface 64 is axially between and angularly offset from the end slot surface 56 and the end slot surface 66 by a non-ninety degree included angle, thereby providing the inner portion 54 with a generally wedge geometry. More particularly, the angled slot surface 64 is angularly offset from the end slot surface 56 by an acute included angle. The angled slot surface 64 is angularly offset from the end slot surface 66 by an obtuse included angle. The inner portion 54 therefore axially tapers as the slot 48 extends circumferentially to the side slot surface 62.

Referring to FIGS. 1 and 2, the rotating assembly 36 is configured to rotate about the axis 32. The rotating assembly 36 of FIGS. 1 and 2 includes a shaft 68 that extends axially along the axis 32. The rotating assembly 36 may also include other rotatable components. An example of such a rotatable component is a rotor which includes a plurality of rotor blades connected to and arranged around one or more rotor disks. Other examples of a rotatable component include, but are not limited to, a shaft sleeve and a contact or non-contact seal element.

The bearing 38 may be configured as a rolling element bearing. The bearing 38 of FIGS. 1 and 2, for example, includes an inner race 70, an outer race 72 and a plurality of rolling elements 74. The inner race 70 is disposed within the outer race 72. The rolling elements 74 may be cylindrical (see FIGS. 1 and 2), conical, spherical or otherwise. The rolling elements 74 are arranged circumferentially around the axis 32 in an annular array. The rolling elements 74 are disposed radially between and in rolling engagement with the inner race 70 and the outer race 72. The present disclosure, however, is not limited to the foregoing exemplary bearing type or configuration.

Figure 5:
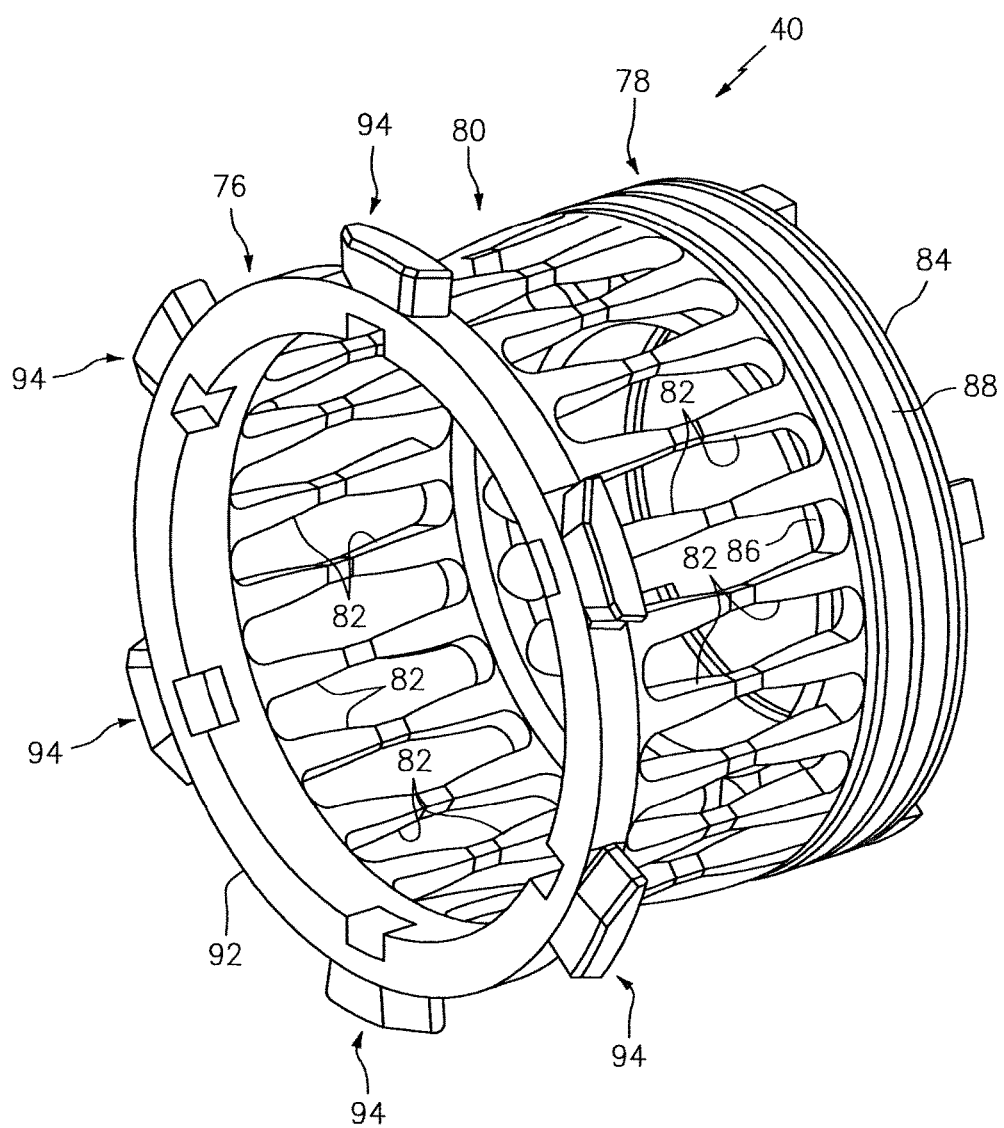
FIG. 5 is a perspective illustration of a centering spring.
Figure 6:
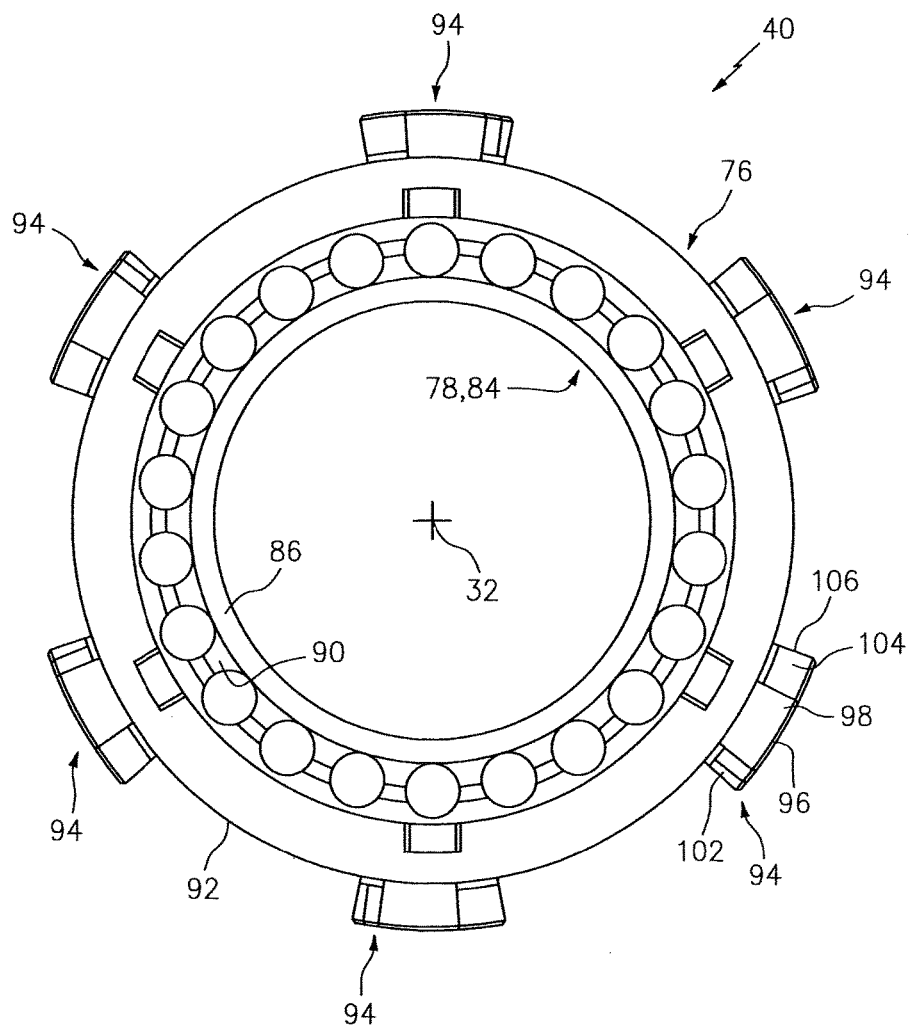
FIG. 6 is a front view illustration of the centering spring.
Figure 7:
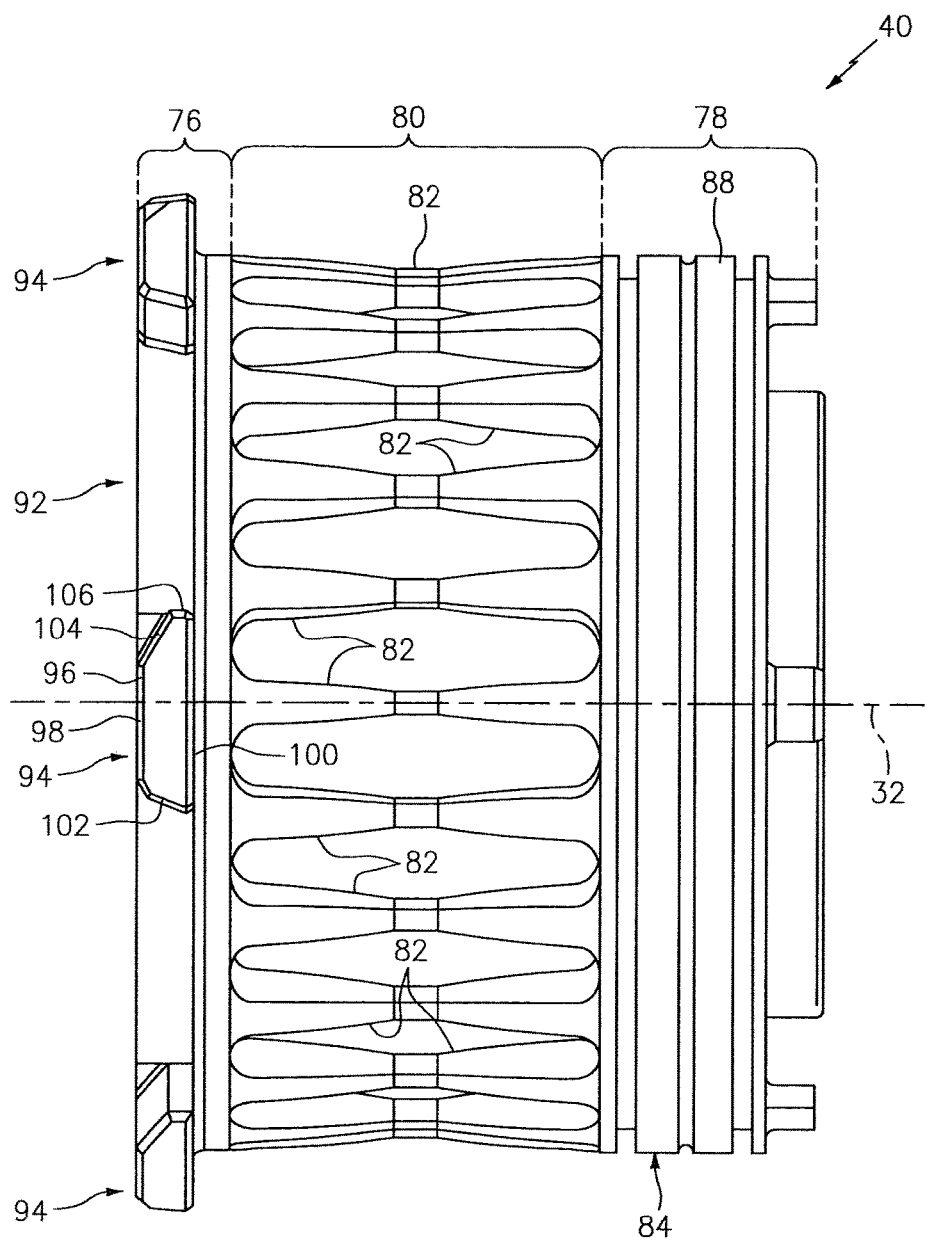
FIG. 7 is a side view illustration of the centering spring.

Referring to FIGS. 5 to 7, the centering spring 40 is configured to resiliently mount and position the bearing 38 (see FIGS. 1 and 2) relative to the static structure 34. The centering spring 40 may be configured as a generally cylindrical cage-like structural component. The centering spring 40 of FIGS. 5 to 7, for example, includes a static mounting portion 76, a bearing mounting portion 78 and a spring portion 80. This spring portion 80 extends axially between and connects the static mounting portion 76 and the bearing mounting portion 78. The spring portion 80 includes a plurality of generally axially extending spring beams 82, which are arranged circumferentially around the axis 32 in an annular array. Each of these spring beams 82 may have a tapered (e.g., double-tapered) geometry, which is selected to provide the spring portion 80 with a radial spring rate. The spring beams 82 may have a round, square, rectangular or other cross-sectional geometry. Furthermore, in other embodiments, the spring beams may alternatively have a non-tapered geometry.

The bearing mounting portion 78 may be configured as or otherwise include an annular hub 84. This hub 84 is configured to mate with the bearing 38; see FIGS. 1 and 2. The hub 84 of FIGS. 5 to 7, for example, includes an annular inner rim 86, an annular outer rim 88 and may include an annular web 90. The outer race 72 of the bearing 38 is disposed within and mounted to the inner rim 86; see FIGS. 1 and 2. The outer rim 88 is connected to the spring beams 82. The web 90 extends radially between and connects the inner rim 86 and the outer rim 88. The web 90 may be apertured as best seen in FIG. 6 to reduce weight for example, or solid. However, in other embodiments, the annular web 90 may be omitted. Furthermore, in some embodiments, the inner rim 86 may function as an outer race for the bearing 38; see FIGS. 1 and 2.

The static mounting portion 76 includes an annular hub 92 and one or more mounting tabs 94. The mounting tabs 94 are arranged circumferentially around the hub 92 and the axis 32 in an annular array. Referring to FIGS. 6 and 7, each of the mounting tabs 94 projects radially out from the hub 92 to a radial outer surface 96. Each of the mounting tabs 94 extends axially between an end tab surface 98 and an end tab surface 100. Each of the mounting tabs 94, as best seen in FIG. 7, also extends axially from the end tab surface 100 to one or more angled tab surfaces 102 and 104. Each of the mounting tabs 94 extends circumferentially from the angled tab surface 102 to the angled tab surface 104 and a side tab surface 106, which extends generally axially between the surfaces 100 and 104.

Each of the angled tab surfaces 102, 104 is axially between and angularly offset from the end tab surface 98 and the end tab surface 100 by a non-ninety degree included angle, thereby providing the mounting tab 94 with a generally wedge geometry. More particularly, the angled tab surface 102 is angularly offset from the end tab surface 98 by an obtuse included angle. The angled tab surface 102 is angularly offset from the end tab surface 100 by an acute included angle. The angled tab surface 104 is angularly offset from the end tab surface 98 by an obtuse included angle. The angled tab surface 104 is angularly offset from the end tab surface 100 by an acute included angle. The mounting tab 94 therefore axially tapers as the tab 94 extends circumferentially to the side tab surface 106.

Figure 8:
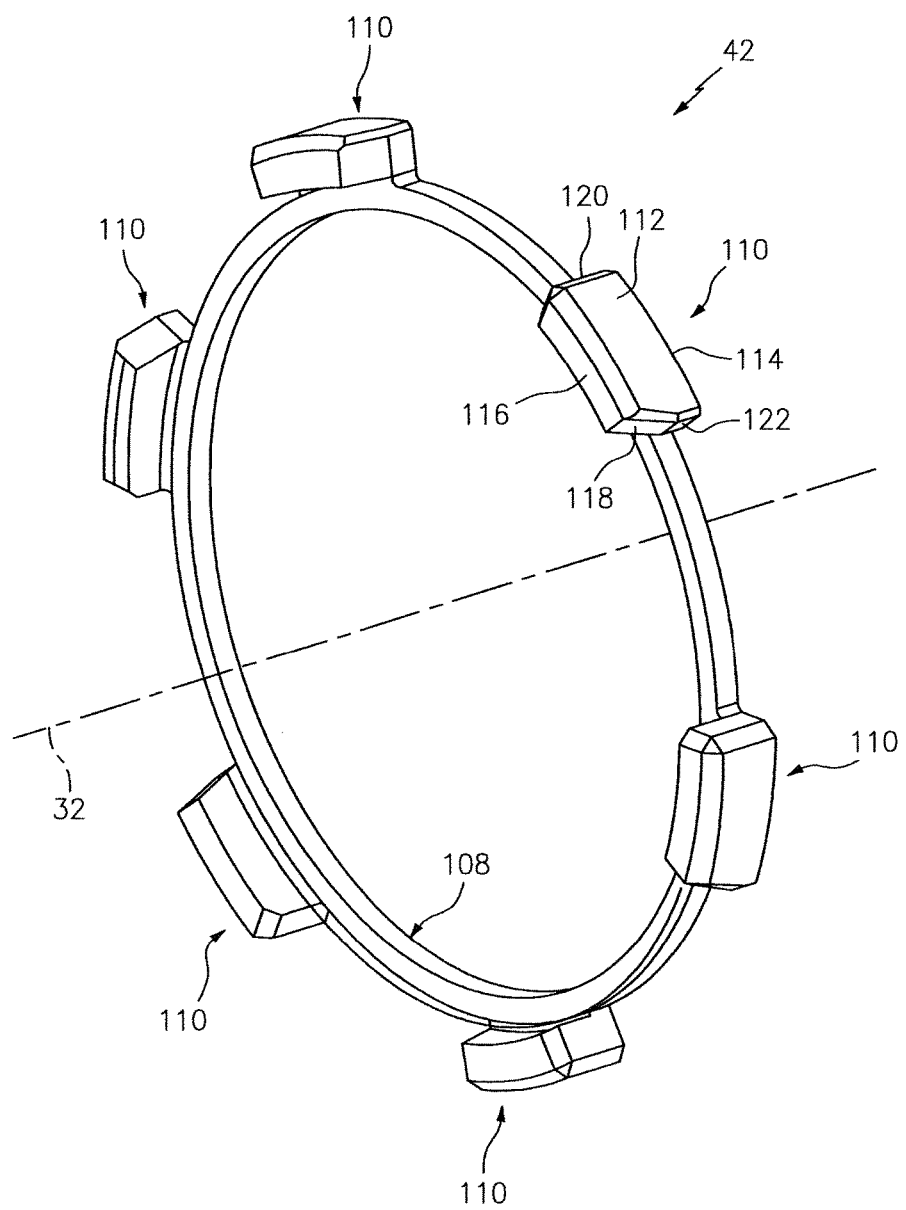
FIGS. 8 and 9 are perspective illustrations of a lock ring.
Figure 9:
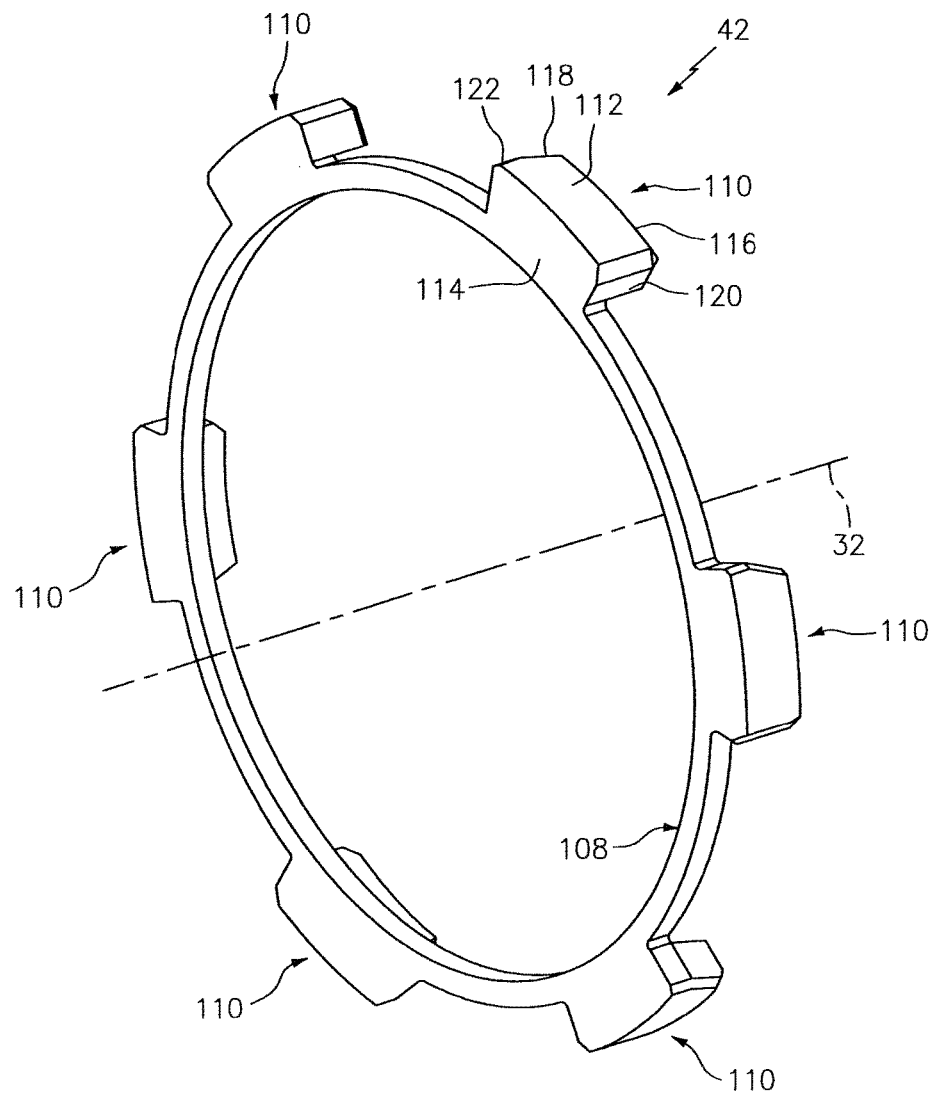

Referring to FIGS. 8 and 9, the lock ring 42 includes an annular hub 108 and one or more locking tabs 110. The locking tabs 110 are arranged circumferentially around the hub 108 and the axis 32 in an annular array. Each of the locking tabs 110 projects radially out from the hub 108 to a radial outer surface 112. Each of the locking tabs 110 extends axially between an end tab surface 114 and an end tab surface 116. Each of the locking tabs 110, as best seen in FIG. 8, also extends axially from the end tab surface 116 to an angled tab surface 118. Each of the locking tabs 110 extends circumferentially from a side tab surface 120 to a side tab surface 122 and the angled tab surface 118.

The angled tab surface 118 is axially between and angularly offset from the end tab surface 114 and the end tab surface 116 by a non-ninety degree included angle, thereby providing the locking tab 110 with a generally wedge geometry. More particularly, the angled tab surface 118 is angularly offset from the end tab surface 114 by an acute included angle. The angled tab surface 118 is angularly offset from the end tab surface 116 by an obtuse included angle. The locking tab 110 therefore axially tapers as the tab 110 extends circumferentially to the side tab surface 122.

Figure 10:
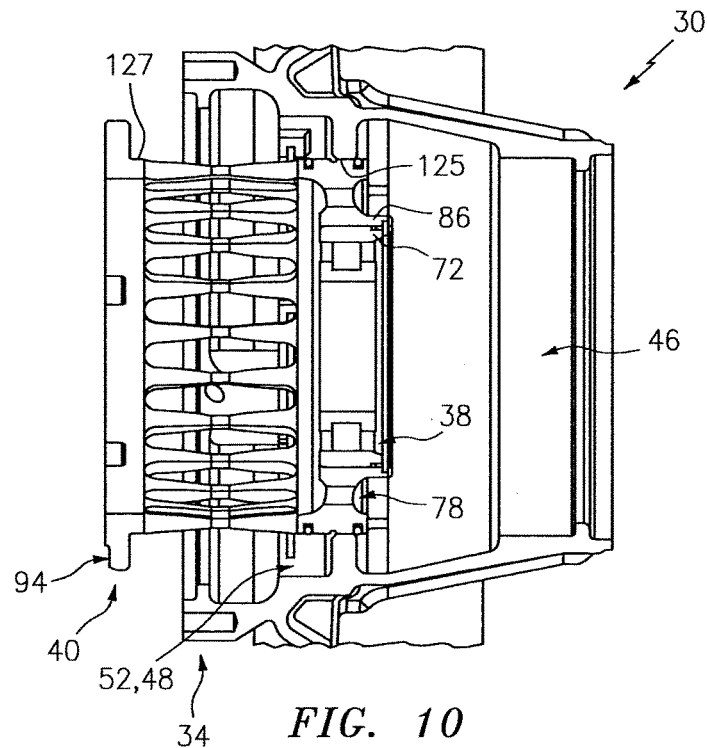
FIGS. 10-13 are a sequence of illustrations depicting the centering spring being mated with the static structure.
Figure 11:
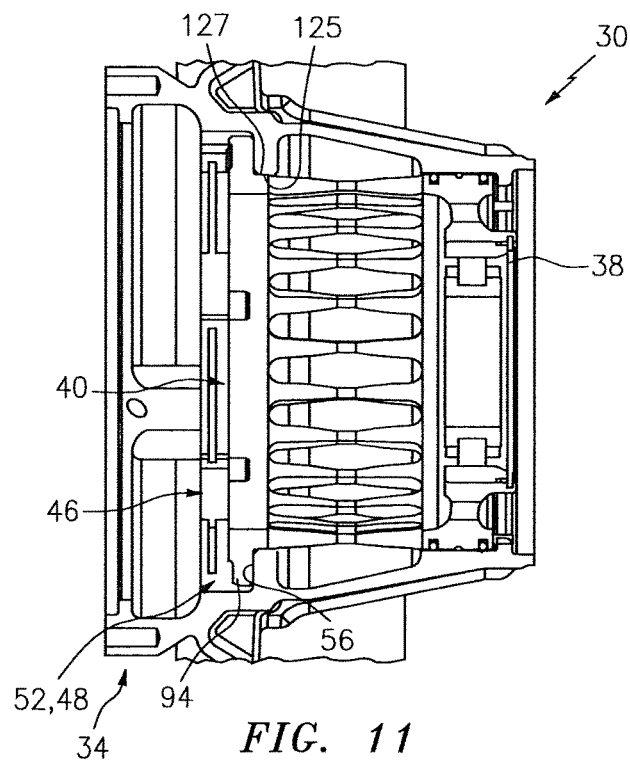
Figure 12:
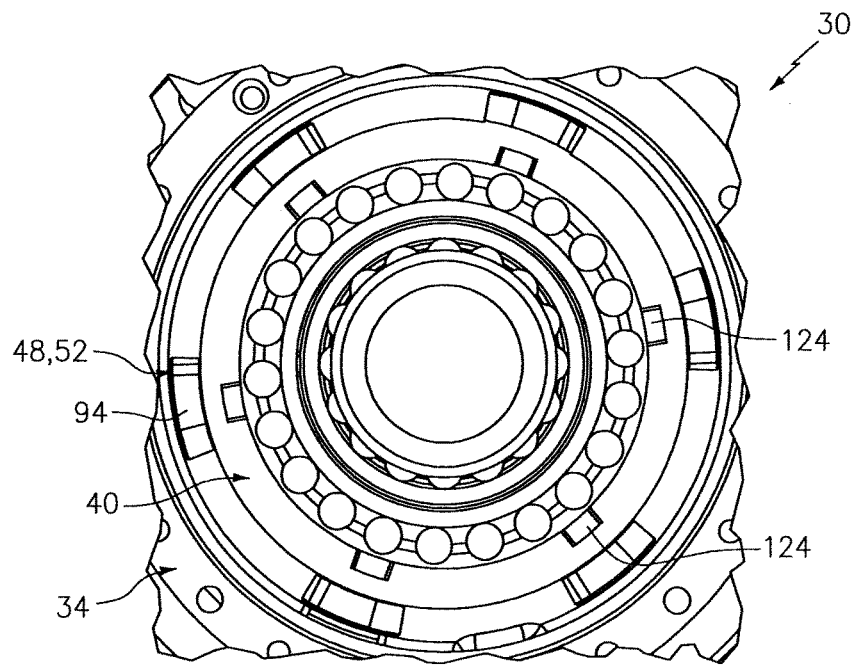
Figure 13:
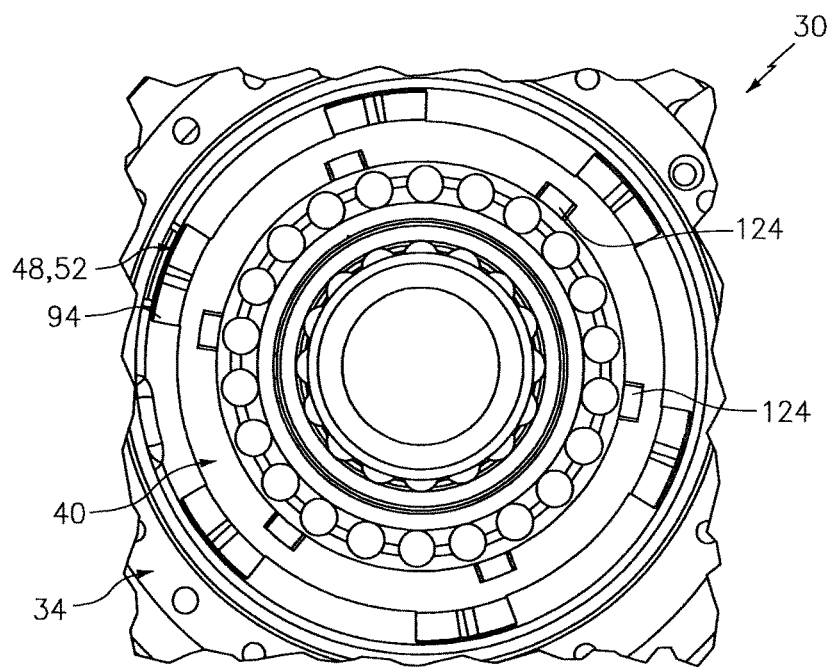

Referring now to FIG. 10, the bearing 38 is mounted to the centering spring 40. More particularly, the outer race 72 is disposed within and mounted to the inner rim 86 of the bearing mounting portion 78. The centering spring 40 may then be axially moved into the bore 46 and nested within the static structure 34 as shown in FIG. 11. To nest the centering spring 40, the mounting tabs 94 are circumferentially aligned with the outer portions 52 of the slots 48 such that each mounting tab may move axially into a respective one of the slots 48. Once the mounting tabs 94 are within the slots 48 and proximate to or engaging the end slot surface 56 (see FIGS. 11 and 14), the centering spring 40 is rotated about the axis 32 as shown in FIGS. 12 and 13. The centering spring 40 may be rotated until respective surfaces 64 and 104 are proximate to one another or engaging one another (see FIG. 14). In this position, each of the mounting tabs 94 is between the surfaces 56 and 66 and at least partially within the inner portion 54 of the slot 48. The foregoing centering installation and rotation may be aided using a tool (not shown) which mates with features 124 (e.g., notched) in the centering spring 40 (see FIGS. 12 and 13).

Figure 14:
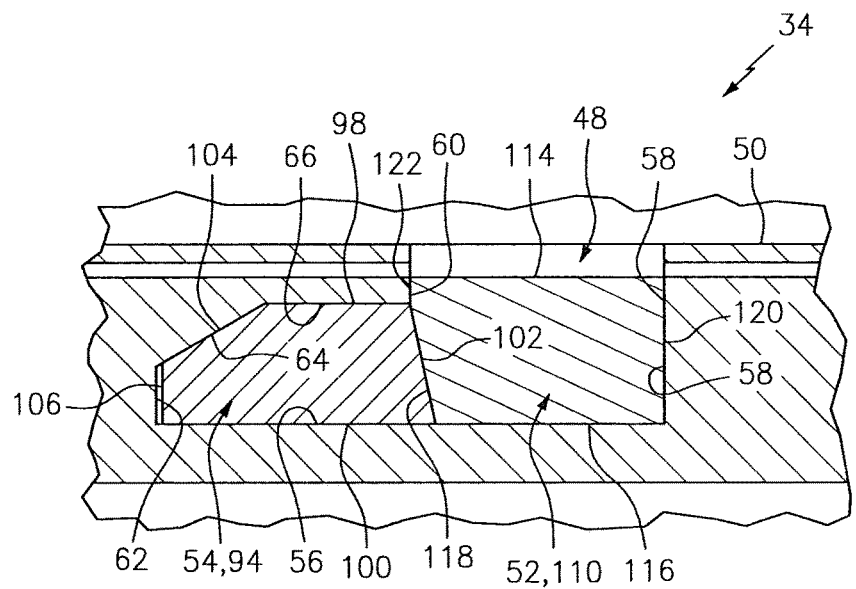
FIG. 14 is a schematic, sectional illustration of a portion of the assembly.
Figure 15:
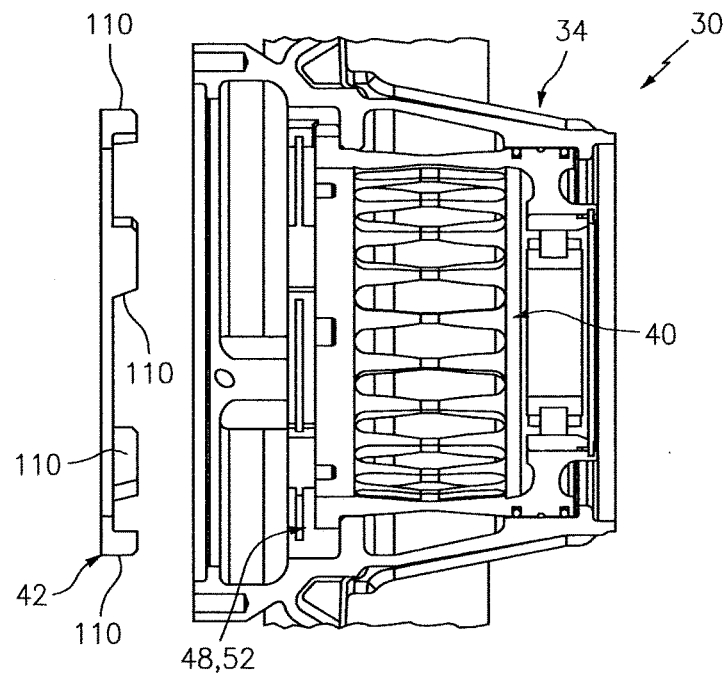
FIGS. 15-17 are a sequence of illustrations depicting the lock ring being mated with the static structure.
Figure 16:
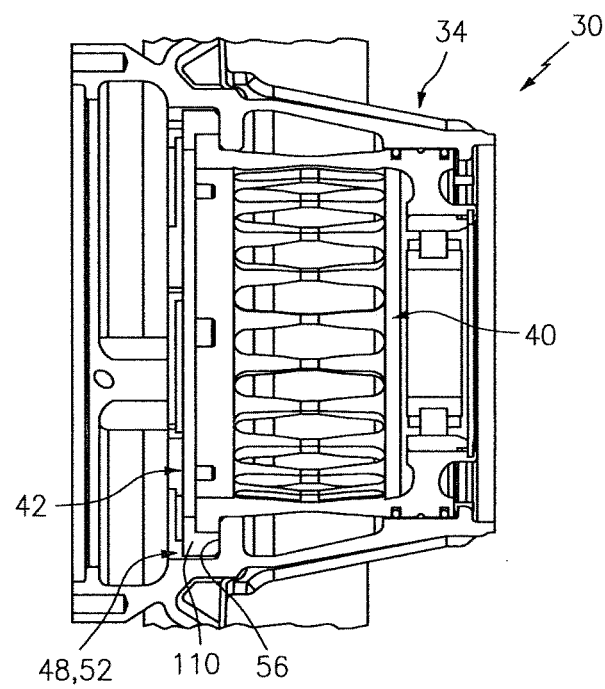
Figure 17:
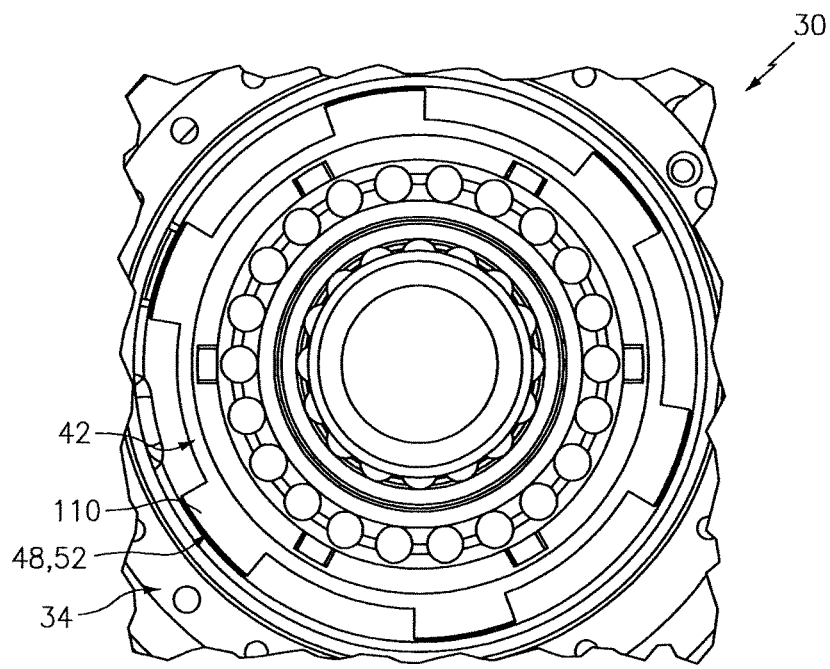

The lock ring 42 is moved axially and nested within the static structure 34 as shown in FIGS. 15 to 17. To nest the lock ring 42, the locking tabs 110 are circumferentially aligned with the outer portions 52 of the slots 48 such that each locking tab 110 may move axially into a respective one of the slots 48. Referring to FIG. 14, as each locking tab 110 is pushed into a respective slot 48, the angled tab surfaces 102 and 118 engage one another and the surfaces 58 and 120 engage one another. This surface engagement translates the axial movement of the locking tab 110 into circumferential movement of the respective mounting tab 94. The configuration of the surfaces 64 and 118 also cause the mounting tab 94 to be axially pressed against the surfaces 56 and 64, which provides a path for load transfer between the centering spring 40 and the static structure 34. The annular surface 125 of the static structure 34 may additionally circumferentially engage with the annular surface 127 of the centering spring 40 to provide a primary path for load transfer between the centering spring 40 and the static structure 34. The circumferential engagement of the annular surfaces 125 and 127 additionally serve to center the axis 32 of the centering spring 40 in the bore 46 ensuring the bearing 38 is centered relative to the centerline 32 of the static structure 34.

Figure 18:
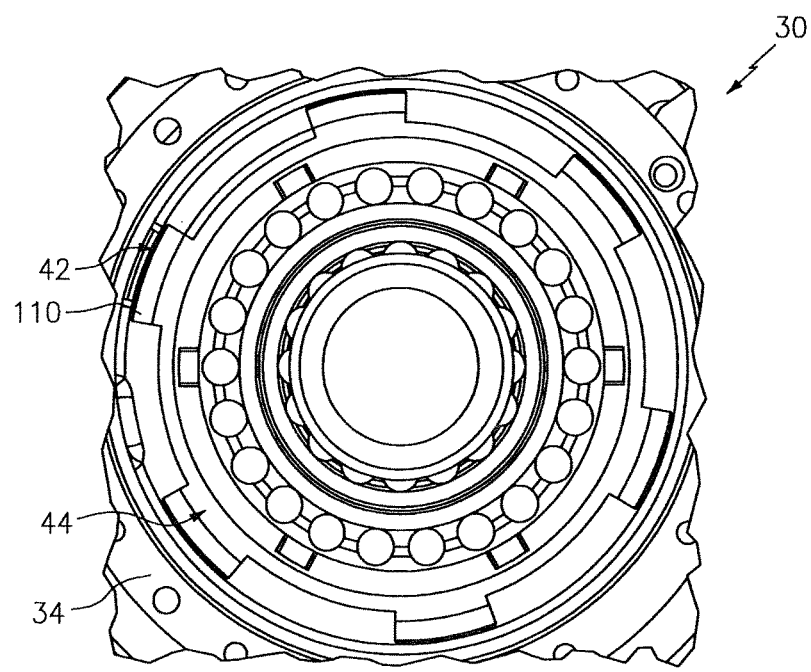
FIG. 18 is an illustration of a retainer ring being mated with the static structure.

Once the lock ring 42 is nested with the static structure 34, the retainer ring 44 is mounted to the static structure 34 as shown in FIG. 18. The retainer ring 44, for example, is disposed within an annular channel in the static structure 34 adjacent the nested lock ring 42. In this manner, the retainer ring 44 axially secures the lock ring 42 with the static structure 34, and the lock ring 42 in turn axially and circumferentially secures the centering spring 40 with the static structure 34.

The rotating assembly 36 may subsequently be mated with the bearing 38 as shown in FIGS. 1 and 2. The shaft 68, for example, may be slid into the inner race 70 of the bearing 38.

Figure 19:
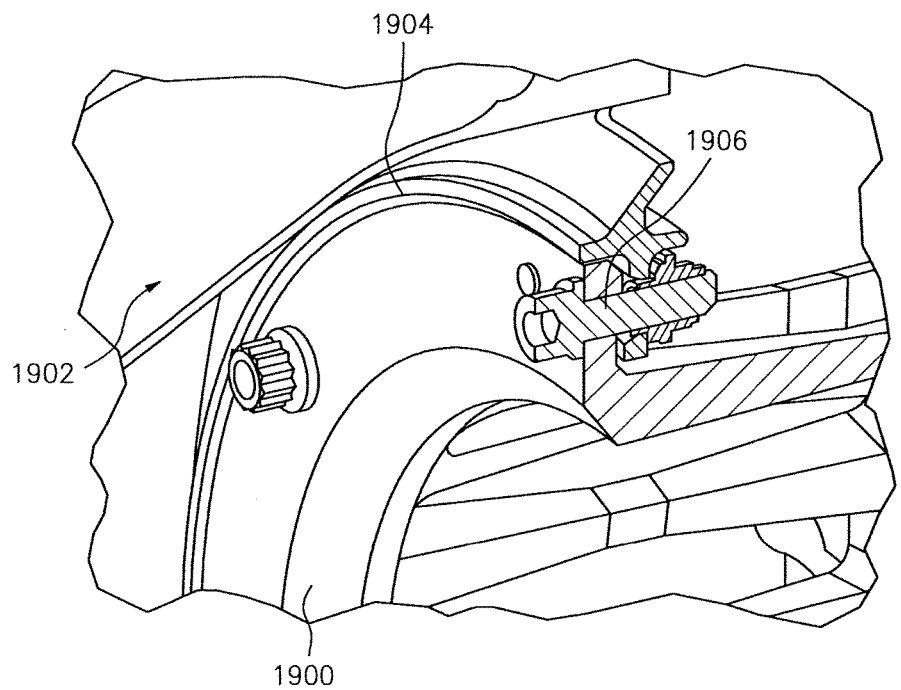
FIG. 19 is a perspective, sectional illustration of a portion of an alternative assembly with a centering spring mounted to a static structure.
Figure 20:
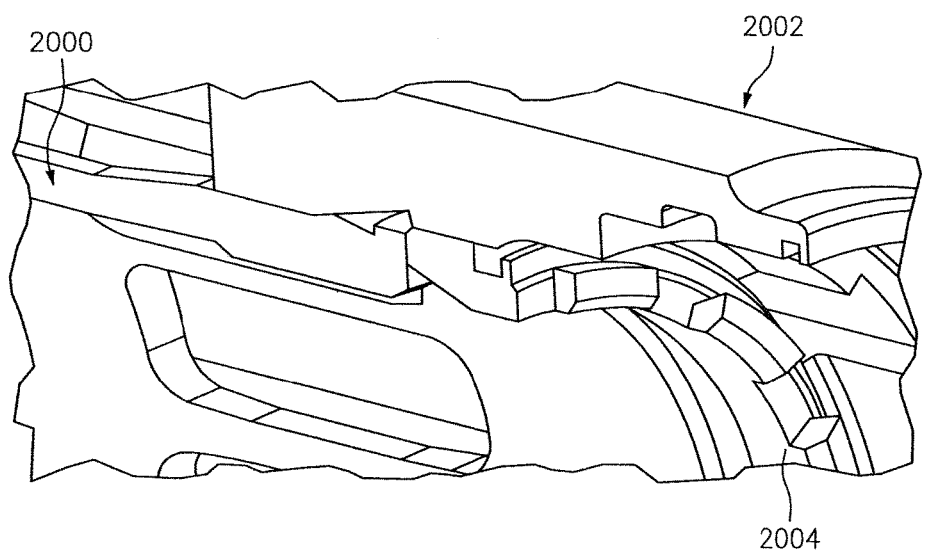
FIG. 20 is a perspective, sectional illustration of a portion of another alternative assembly with a centering spring mounted to a static structure.

FIGS. 19 and 20 illustrate alternative methodologies for securing a centering spring 1900, 2000 to a static structure 1902, 2002. In FIG. 19, the centering spring 1900 includes an annular flange 1904 which is bolted to the static structure 1902. Such an annular flange 1904, however, requires more radial clearance than the mounting tabs 94 of FIGS. 1 and 2 since the flange of FIG. 19 requires a minimum amount of material below and above the fasteners 1906. In FIG. 20, the centering spring 2000 is secured to the static structure 2002 by a stacking nut 2004. Such a stacking nut 2004, however, requires more axial clearance than the locking ring 42 of FIGS. 1 and 2. In particular, whereas the stacking nut 2004 of FIG. 20 extends axially from the interface with the centering spring 2000, the locking ring 42 of FIGS. 1 and 2 is spatially integrated with the centering spring 40 reducing the axial space consumed by the nested centering spring 40 and locking ring 42.

One or more of the slots 48, the mounting tabs 94 and/or the locking tabs 110 may have a different configuration than that described above. For example, the mounting tab 94 may be configured without the angled tab surface 102 and/or 104. The locking tab 110 may be configured without the angled tab surface 118. Similarly, the static structure 34 may be configured without the surface 64.

Figure 21:
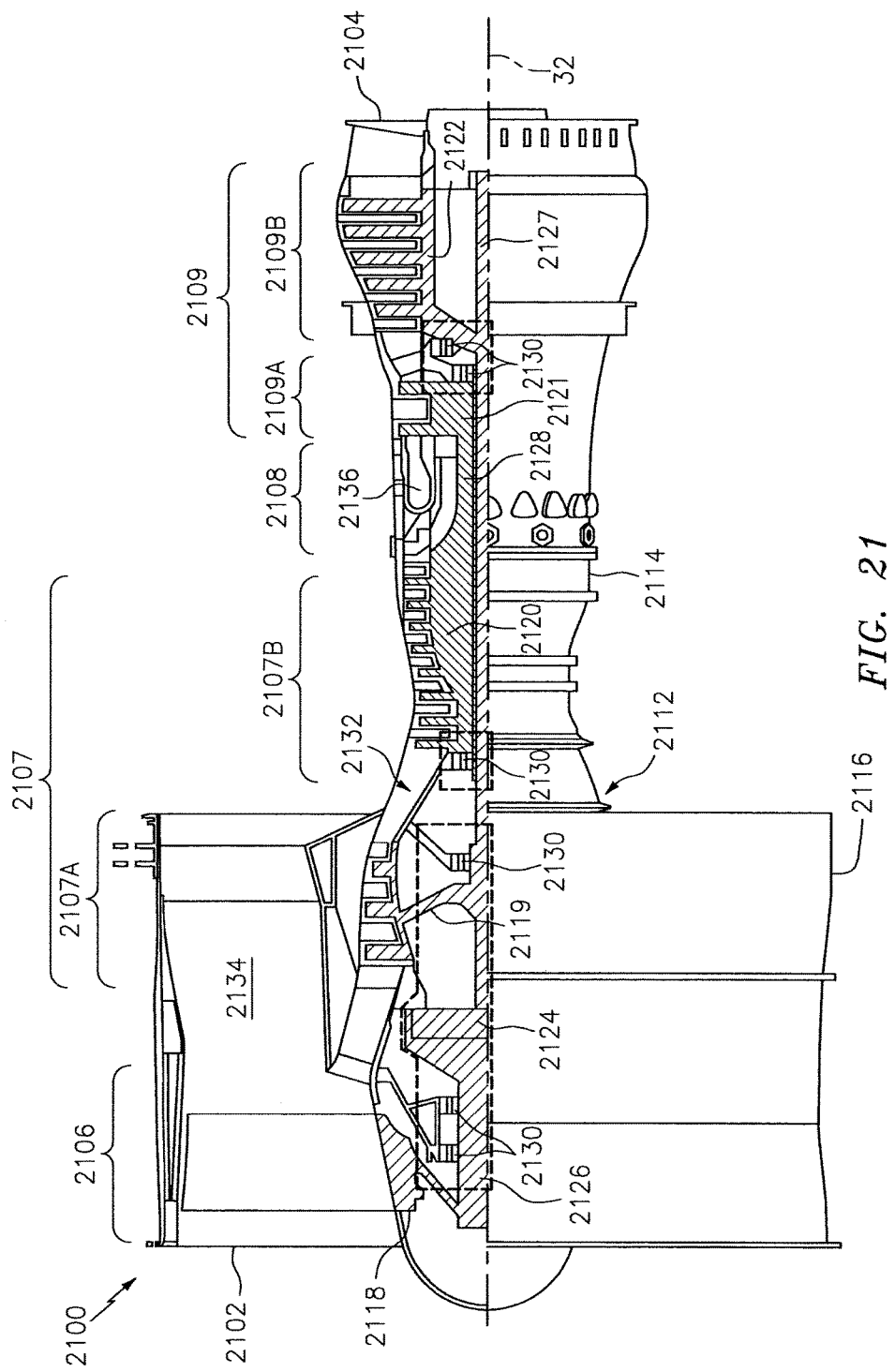
FIG. 21 is a side cutaway illustration of a geared turbofan engine.

FIG. 21 illustrates an exemplary geared turbofan gas turbine engine 2100 in which the assembly may be included. This turbine engine 2100 extends along the rotational axis 32 between an upstream airflow inlet 2102 and a downstream airflow exhaust 2104. The turbine engine 2100 includes a fan section 2106, a compressor section 2107, a combustor section 2108 and a turbine section 2109. The compressor section 2107 includes a low pressure compressor (LPC) section 2107A and a high pressure compressor (HPC) section 2107B. The turbine section 2109 includes a high pressure turbine (HPT) section 2109A and a low pressure turbine (LPT) section 2109B.

The engine sections 2106-2109 are arranged sequentially along the rotational axis 32 within an engine housing 2112. This housing includes an inner case 2114 (e.g., a core case) and an outer case 2116 (e.g., a fan case). The inner case 2114 may house one or more of the engine sections 2107-2109; e.g., an engine core. The outer case 2116 may house at least the fan section 2106.

Each of the engine sections 2106, 2107A, 2107B, 2109A and 2109B includes a respective rotor 2118-2122. Each of these rotors 2118-2122 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 2118 is connected to a gear train 2124, for example, through a fan shaft 2126. The gear train 2124 and the LPC rotor 2119 are connected to and driven by the LPT rotor 2122 through a low speed shaft 2127 (e.g., shaft 68; see FIGS. 1 and 2). The HPC rotor 2120 is connected to and driven by the HPT rotor 2121 through a high speed shaft 2128. The shafts 2126-2128 are rotatably supported by a plurality of bearings 2130; e.g., the bearing 38 of FIGS. 1 and 2. Each of these bearings is connected to the engine housing by at least one static structure (e.g., static structure 34; see FIGS. 1 and 2) such as, for example, an annular support strut.

During operation, air enters the turbine engine 2100 through the airflow inlet 2102. This air is directed through the fan section 2106 and into a core gas path 2132 and a bypass gas path 2134. The core gas path 2132 extends sequentially through the engine sections 2107-2109. The bypass gas path 2134 extends away from the fan section 2106 through a bypass duct, which circumscribes and bypasses the engine core. The air within the core gas path 2132 may be referred to as "core air". The air within the bypass gas path 2134 may be referred to as "bypass air".

The core air is compressed by the compressor rotors 2119 and 2120 and directed into a combustion chamber 2136 of a combustor in the combustor section 2108. Fuel is injected into the combustion chamber 2136 and mixed with the compressed core air to provide a fuel-air mixture. This fuel air mixture is ignited and combustion products thereof flow through and sequentially cause the turbine rotors 2121 and 2122 to rotate. The rotation of the turbine rotors 2121 and 2122 respectively drive rotation of the compressor rotors 2120 and 2119 and, thus, compression of the air received from a core airflow inlet. The rotation of the turbine rotor 2122 also drives rotation of the fan rotor 2118, which propels bypass air through and out of the bypass gas path 2134. The propulsion of the bypass air may account for a majority of thrust generated by the turbine engine 2100, e.g., more than seventy-five percent (75%) of engine thrust. The turbine engine 2100 of the present disclosure, however, is not limited to the foregoing exemplary thrust ratio.

The rotational equipment assembly 30 may be included in various aircraft and industrial turbine engines other than the one described above, as well as in other types of rotational equipment. The rotational equipment assembly 30, for example, may be included in a geared turbine engine where a gear train connects one or more shafts to one or more rotors in a fan section, a compressor section and/or any other engine section. Alternatively, the rotational equipment assembly 30 may be included in a turbine engine configured without a gear train. The rotational equipment assembly 30 may be included in a geared or non-geared turbine engine configured with a single spool, with two spools (e.g., see FIG. 21), or with more than two spools. The turbine engine may be configured as a turbofan engine, a turbojet engine, a propfan engine, a pusher fan engine or any other type of turbine engine. The present invention therefore is not limited to any particular types or configurations of turbine engines or rotational equipment.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An assembly for a piece of rotational equipment with an axis, comprising:
 a static structure configured with a bore, a slot, a first slot surface and a second slot surface, the slot extending radially into the static structure from the bore, and the slot extending axially within the static structure between the first slot surface and the second slot surface;
 a bearing within the bore; and
 a centering spring mounting the bearing to the static structure, the centering spring comprising an annular hub and a mounting tab, the annular hub within the bore, and the mounting tab projecting radially from the annular hub into the slot;
 wherein the centering spring comprises a first mounting portion, a second mounting portion and a spring portion extending axially between the first mounting portion and the second mounting portion;
 wherein the first mounting portion comprises the annular hub and the mounting tab; and
 wherein the bearing is within and mounted to the second mounting portion.

2. The assembly of claim 1, wherein the mounting tab is disposed between the first slot surface and the second slot surface.

3. The assembly of claim 1, wherein the slot has a generally L-shaped geometry.

4. The assembly of claim 1, wherein
 an inner portion of the slot extends axially within the static structure between the first slot surface and the second slot surface, and an outer portion of the slot extends axially into the static structure to the second slot surface; and
 the mounting tab is disposed at least partially within the inner portion of the slot.

5. The assembly of claim 4, wherein the centering spring is configured such that the mounting tab is operable to slide axially through the outer portion of the slot towards the second slot wall and then slide circumferentially into the inner portion of the slot.

6. The assembly of claim 4, wherein
 the inner portion of the slot extends circumferentially within the static structure to a third slot surface;
 the third slot surface is axially between the first slot surface and the second slot surface, and is angularly offset from the first slot surface and the second slot surface by an non-ninety degree included angle; and the mounting tab engages the third slot surface.

7. The assembly of claim 1, wherein the mounting tab extends axially between a first tab surface and a second tab surface and circumferentially to a third tab surface;

the third tab surface is axially between the first tab surface and the second tab surface, and is angularly offset from the first tab surface and the second tab surface by a non-ninety degree included angle; and the static structure engages the third tab surface.

8. The assembly of claim 1, wherein at least a portion of the mounting tab has a wedge-shape geometry configured to be circumferentially wedged into a portion of the slot.

9. The assembly of claim 1, wherein the slot is one of a plurality of slots, the first slot surface is one of a plurality of first slot surfaces, and the second slot surface is one of a plurality of second slot surfaces;

each of the slots extends radially into the static structure from the bore and extends axially within the static structure between a respective one of the first slot surfaces and a respective one of the second slot surfaces; and the mounting tab is one of a plurality of mounting tabs disposed circumferentially about the annular hub, and each of the mounting tabs projects radially out from the annular hub into a respective one of the slots and is disposed between a respective one of the first slot surfaces and a respective one of the second slot surfaces.

10. The assembly of claim 1, wherein the spring portion comprises a plurality of tapered spring beams arranged about the axis.

11. The assembly of claim 1, wherein the piece of rotational equipment is configured as a gas turbine engine.

12. The assembly of claim 1, further comprising a rotating assembly, wherein the bearing circumscribes the rotating assembly and rotatably mounts the rotating assembly to the centering spring.

13. An assembly for a piece of rotational equipment with an axis, comprising:

a static structure configured with a bore, a slot, a first slot surface and a second slot surface, the slot extending radially into the static structure from the bore, and the slot extending axially within the static structure between the first slot surface and the second slot surface;

a bearing within the bore;

a centering spring mounting the bearing to the static structure, the centering spring comprising an annular hub and a mounting tab, the annular hub within the bore, and the mounting tab projecting radially from the annular hub into the slot; and a lock ring comprising a locking tab, the locking tab projecting radially into the slot, and the locking tab engaging and circumferentially between the static structure and the mounting tab.

14. The assembly of claim 13, wherein the mounting tab extends axially between a first tab surface and a second tab surface and circumferentially to a third tab surface;

the third tab surface is axially between the first tab surface and the second tab surface, and is angularly offset from the first tab surface and the second tab surface by a non-ninety degree included angle; and the locking tab engages the third tab surface.

15. The assembly of claim 13, further comprising a retainer ring axially securing the lock ring within the bore.

16. The assembly of claim 13, wherein an inner portion of the slot extends axially within the static structure between the first slot surface and the second slot surface, and an outer portion of the slot extends axially into the static structure to the second slot surface; and the mounting tab is disposed at least partially within the inner portion of the slot.

17. An assembly for a piece of rotational equipment with an axis, comprising:

a static structure configured with a bore, a slot, a first slot surface and a second slot surface, the slot extending radially into the static structure from the bore, an inner portion of the slot extending axially within the static structure between the first slot surface and the second slot surface, and an outer portion of the slot extending axially into the static structure to the second slot surface;

a bearing within the bore; and a centering spring mounting the bearing to the static structure, the centering spring comprising an annular hub and a mounting tab, the annular hub within the bore, and the mounting tab projecting radially from the annular hub into the inner portion of the slot;

wherein the centering spring is configured such that the mounting tab is operable to slide axially through the outer portion of the slot towards the second slot wall and then slide circumferentially into the inner portion of the slot.

18. An assembly for a piece of rotational equipment with an axis, comprising:

a static structure configured with a bore, a slot, a first slot surface and a second slot surface, the slot extending radially into the static structure from the bore, an inner portion of the slot extending axially within the static structure between the first slot surface and the second slot surface, and an outer portion of the slot extending axially into the static structure to the second slot surface;

a bearing within the bore;

a centering spring mounting the bearing to the static structure, the centering spring comprising an annular hub and a mounting tab, the annular hub within the bore, and the mounting tab projecting radially from the annular hub into the inner portion of the slot; and a lock ring comprising a locking tab, the locking tab projecting radially into the outer portion of the slot, and the locking tab engaging and circumferentially between the static structure and the mounting tab.

19. The assembly of claim 18, further comprising a retainer ring axially securing the lock ring within the bore.

* * * * *